Feb. 18, 1958 R. S. OHL 2,824,269
SILICON TRANSLATING DEVICES AND SILICON ALLOYS THEREFOR
Filed Jan. 17, 1956
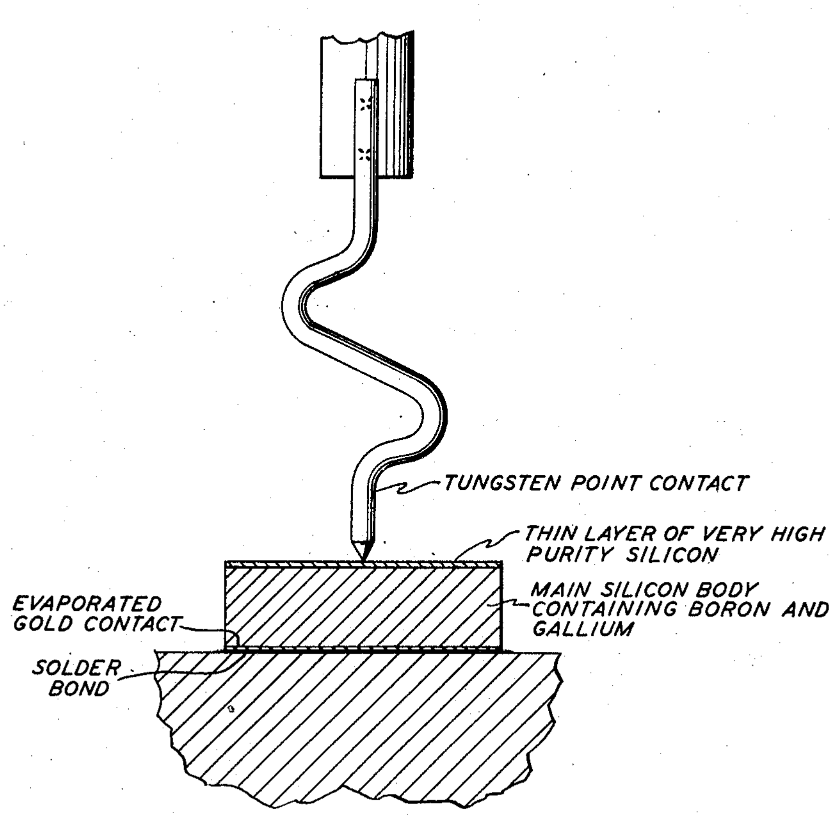
INVENTOR
R. S. OHL
BY D.H. Wilson, Jr.
ATTORNEY United States Patent Office 2,824,269

Patented Feb. 18, 1958

2,824,269

SILICON TRANSLATING DEVICES AND SILICON ALLOYS THEREFOR

Russell S. Ohl, Fair Haven, N. J., assignor to Bell Telephone Laboratories, Incorporated, New York, N. Y., a corporation of New York Application January 17, 1956, Serial No. 559,753

6 Claims. (Cl. 317—236)

This invention relates to improved silicon compositions and to electrical translating devices fabricated therefrom.

The principal objects of the invention are to improve the electrical and mechanical properties of silicon alloys, to render silicon alloys softer and more workable, to increase the conductivity of silicon, to increase the mechanical uniformity of silicon surfaces, to facilitate the manufacture of silicon translating devices, and to avoid variations in the contact area of silicon point contact translating devices.

In the past silicon translating devices have been fabricated from high purity silicon, silicon of about 99.8 percent or greater purity, containing a minute quantity of boron which functions to reduce the resistivity and thereby improve certain electrical characteristics of semiconductive bodies derived therefrom, particularly when employed in high frequency applications. Silicon for use in point contact rectifiers operating at one-half centimeter wavelength is commonly of a resistivity of about 0.005 ohm-centimeter in order to reduce the spreading resistance and thus the power loss in the device. To achieve this resistivity 0.02 weight percent of boron is incorporated in the high purity silicon and where lower resistivities are desired, considerably greater amounts of boron, up to about 0.5 weight percent, are desirable.

The utilization of boron to achieve these desired electrical characteristics, at least at lower concentrations of boron, has been proposed in Patent 2,485,069 which issued October 18, 1949, to J. H. Scaff and H. C. Theuerer and is entitled "Translating Material of Silicon Base." In that patent it was suggested that the quantity of boron might range up to 0.2 of one percent by weight of the total material.

Silicon containing about 0.01 weight percent or more of boron is extremely brittle and hard and hence difficult to work. Further, single crystals of silicon containing these quantities of boron which have surfaces polished by techniques involving high temperature oxidation and removal of the oxide by etching often exhibit surface pits. The density of these pits is a direct function of the boron concentration in the silicon. This pitting and the resultant surface deterioration has been so marked that in some samples containing 0.2 weight percent of boron the surface was so irregular that it was extremely difficult to engage it with a point contact to define a desired contact area, inasmuch as the density of minute holes or pits on the surface was so great when it was polished that the points of many units fabricated therefrom slipped into those holes, producing wide and inconsistent variations in the rectifying contact area from unit to unit. Units were produced from this material with a very low yield as a result of these contact area variations. Similarly, in the case of large area rectifying contacts made of material of this nature, it has been observed that the electrical characteristics of the contacts vary between units, again presumably due to these surface irregularities.

Surface irregularities in silicon containing relatively large quantities of boron have been eliminated or substantially reduced in accordance with this invention by adding a small quantity of gallium to the silicon-boron alloy. In particular, it appears that the most favorable surface characteristics can be realized by employing gallium and boron as additives to high purity silicon in quantities such that the ratio of the atomic percentages of gallium to boron is about 0.77. According to one proposed mechanism having some support in the experimental evidence derived from studies of these alloys, the presence of boron, a smaller atom than silicon, in solution with silicon tends to decrease the lattice constant approximately linearly with increases in the atomic percent of boron up to its solubility limit. This tendency towards a decreased lattice constant is overcome by the incorporation in solution with the silicon-boron solution of an appropriate amount of a larger atom than silicon to compensate for the presence of boron. Gallium is one such atom, having essentially the same electrical characteristics in silicon as boron, namely it is an electron acceptor.

In view of the above, one feature of this invention resides in compensating for the presence of a conductivity type determining substance having atomic dimensions differing from those of silicon, for example smaller than silicon, in solution with silicon by incorporating in the solution a substance having atomic dimensions differing from those of silicon in a manner opposite that of the conductivity type determining substance, for example larger than silicon, thereby maintaining a lattice constant for the alloy which is essentially the same as that of pure silicon. Advantageously the second substance offers the same conductivity type determining characteristics as the first.

Another feature resides in the use of a ternary alloy of silicon, boron, and gallium to provide a material of improved electrical and mechanical characteristics.

A further feature involves an improved point contact translator for operation at millimeter wavelengths including a finely pointed rectifying contact engaging a high impedance surface on a silicon body containing boron and gallium.

The invention, together with the above and other objects and features thereof, will be more fully appreciated from the following detailed description.

In the preparation of point contact silicon rectifiers for applications in millimeter wavelengths, it has been common practice to draw a rod of single crystal material from a melt by melting a silicon mass of a purity somewhat higher than 99.8 percent in a crucible; for example, an inductively heated graphite crucible having a silica liner, dipping a single crystal seed of a desired orientation into the face of the melt and slowly withdrawing it therefrom while freezing the material adhering thereto. The resulting single crystal is then sliced and diced into wafers or other body forms for incorporation in the rectifier or other translating units.

To insure stability and uniformity of contact in both the rectifying and ohmic contacts of a point contact structure, the silicon surface is given on optical polish. This is accomplished by first rough grinding both faces of a slice to a thickness of about 10 mils with a coarse abrasive such as 600 mesh Carborundum on a cast iron lapping plate. The roughness is then removed by scratch-polishing the surface with 800 mesh boron carbide, followed by an optical polish with sapphire dust on a tin lap. A layer of silicon about 1000 A. thick, which is disturbed by the polishing, is removed from the surface by oxidation for fifteen minutes in steam at 1000° C. The oxide surface film is removed by immersion in 24 percent hydrofluoric acid for about fifteen minutes to reveal a single crystal surface wherein the impurities have been depleted to a level substantially below that in the bulk silicon and having a high degree of crystallographic perfection. Additional processing steps can be applied to the surfaces depending upon its intended use. The surface may be subjected to additional oxidation and oxide removal steps, it may be bombarded with ions as disclosed in R. S. Ohl application Serial No. 141,512, filed January 31, 1950, now Patent No. 2,750,541, entitled "Semiconductor Translating Devices," or it merely may be cleaned after the single oxidation described above.

An excellent ohmic connection can be applied to one face of the slice by evaporating a thin layer of gold thereon in a vacuum of about $10^{-6}$ millimeters of mercury at 200° C. to 250° C. This gold is alloyed with the silicon by heating it in a vacuum at some temeprature above the silicon-gold eutectic but below that at which any substantial diffusion of gold occurs, for example at about 400° C., for two minutes.

A restricted area contact is made to the opposite face of the wafer after that face has been given an appropriate cleansing treatment, for example, by etching it in hydrofluoric acid and flooding it with methyl alcohol, as disclosed in R. S. Ohl application Serial No. 553,697, filed December 19, 1955.

It has been observed in the preparation of translating devices from single crystal silicon of the type described above, particularly that material containing greater than about 0.01 weight percent of boron, in order to reduce the bulk resistivity to low levels, that many silicon surfaces subjected to the above polishing and impurity depletion treatments contained large numbers of microscopic pits having a diameter of the order of 0.1 mil. X-ray crystal lattice measurements established that the presence of boron in high purity silicon causes the crystal lattice to shrink during freezing of the metal from the molten state in a manner different from that for pure silicon. From this it has been postulated that the pits observed on polished silicon surfaces were due to this crystal lattice shrinkage. Its presence in solution with silicon causes a decrease in the lattice constant of the crystal by an amount which is essentially linearly related to the atomic percentage of boron in solution.

In order to maintain a lattice constant corresponding to that of pure silicon in accordance with this invention, an atom which is compatible electrically with the acceptor characteristics of the boron atom in silicon and which is larger than a silicon atom, is added to the silicon-boron alloy in a quantity sufficient to just compensate for the presence of the undersized boron atom. Test specimens prepared in accordance with this theory of the mechanism creating the pitted, polished surface observed, have exhibited the desired low bulk resistivity and have the shrinkage holes or pits observed in specimens prepared in accordance with prior techniques eliminated or substantially reduced in concentration. Two acceptor atoms which are larger than silicon and therefore presumably can be employed to compensate for the presence of boron in maintaining a lattice constant corresponding to that of pure silicon are gallium and aluminum.

It has been observed that predominantly silicon single crystal ternary alloys of aluminum are quite difficult to produce in accordance with presently available techniques. Accordingly, considerable advantage is to be realized over silicon-aluminum-boron alloys in utilizing ternary alloys of silicon, gallium, and boron. For this reason, the following discussion will be directed to the latter form of ternary alloy although it is to be understood that the postulated mechanism for realizing pit-free polished silicon surfaces in single crystal silicon containing large percentages of boron is considered applicable to ternary crystals of silicon, aluminum, and boron.

It may be noted at this point that I do not desire to restrict my invention to the proposed mechanism inasmuch as I recognize that the successful results obtained from a ternary silicon-gallium-boron alloy may be attributable to a modification of the physical and/or chemical reactions occurring during the polishing of the silicon surface. Another plausible explanation for the observed effects may be that the gallium inhibits any reactions which in its absence tend to attack preferred portions of the surface, thereby creating the pits.

One example of a silicon-gallium-boron alloy having a 0.005 ohm-centimeter resistivity suitable for use in point contact rectifiers operable at five millimeters was prepared by adding to high purity silicon .02 weight percent of boron and .129 weight percent of gallium. Specimens derived from this alloy, when polished in accordance with the technique set forth above, exhibited surfaces which were substantially free of pits and could be incorporated into semiconductive devices without the meticulous positioning of pointed tungsten contacts which had been necessary heretofore. The utilization of this silicon-boron-gallium alloy in a point contact rectifier is illustrated in the drawing wherein the techniques discussed above have been applied to the silicon to produce a thin high purity surface layer which is contacted by the pointed tungsten whisker and a substantially symmetrical low resistance contact is formed on the face opposite that high purity layer by evaporating gold thereon. The gold coated face is soldered to a suitable conductive base member.

One technique of preparing a silicon-boron-gallium molten solution resides in placing in a graphite crucible having a silicon liner two or more bodies of a silicon-boron alloy containing the boron concentration required in the final product. An appropriate quantity of gallium is supplied to the mixture by coating the interfacial regions of the solid bodies therewith. This avoids any substantial loss through evaporation of gallium during the melting of the mixture. Gallium melts at extremely low temperatures. However, when confined or maintained in intimate contact with silicon in this manner, it enters into the silicon solution without appreciable evaporation and becomes less volatile. The material in the crucible is raised to about 1450° C. in an inert atmosphere such as helium at atmospheric pressures and maintained at that temperature until the distribution of materials is sufficiently near equilibrium for growth of material with reasonably uniform resistivity, about ten to twenty minutes. A single crystal body of the desired crystal orientation is then brought into contact with the face of the melt and crystal growth is initiated by withdrawing the body and molten material adhering thereto from the melt at a rate of from 1 to 3 mils per second.

Alternatively, the melt from which the crystal is grown can be prepared by mixing appropriate quantities of silicon-boron and silicon-gallium alloys. When such alloy mixtures are employed essentially no gallium is lost by vaporization.

Compensation for the presence of boron by the addition of gallium or aluminum is effective over the entire range in which boron enters into solution with silicon; this range extending from about 0.01 to about 0.5 weight percent of boron. The optimum relationship of the atomic percent of gallium to the atomic percent of boron in solution with silicon, to maintain a lattice constant essentially that of pure silicon, is about 0.77. However, some compensation is realized when this ratio deviates substantially from the optimum, an effective range of ratios in silicon containing boron and gallium being from about 0.4 to about 1.1. This optimum proportion was determined from a consideration of the effective atomic radius of boron, gallium, and silicon and the influence of atoms of different radii in what might be considered a unit cell of the alloy crystal. These radii are as follows: boron 1.02 A. units; gallium 1.33 A. units; and silicon 1.175 A. units. It can be shown that in order to have a lattice compensation which results in a lattice constant essentially that of pure silicon $$X(R_{Si}^3-R_B^3)=Y(R_{Ga}^3-R_{Si}R_{Si}^2)$$

so that $$Y = X\left(\frac{1-\left(\frac{R_B}{R_{Si}}\right)^3}{-1+\left(\frac{R_{Ga}}{R_{Si}}\right)^3}\right) = .765X$$

where X is the atomic percent of boron in the silicon, Y is the atomic percent of gallium in the silicon, $R_{Si}$ is the atomic radius of silicon, $R_B$ is the atomic radius of boron and $R_{Ga}$ is the atomic radius of gallium. Alternatively, aluminum can be substituted for gallium wherein the radius of the aluminum atom is 1.43 A. units and the optimum ratio of the atomic percentage of aluminum to the atomic percentage of boron is about 0.43, with the range of ratios effective for compensation extending from about 0.2 to 0.6. When an extremely high conductivity p-type silicon body is desired, such as silicon having a resistivity of .0005 ohm-centimeter, pit-free polished silicon surfaces can be obtained by adding 0.2 weight percent of boron to high purity silicon and .985 weight percent of gallium, or .215 weight percent of aluminum. Similarly, where pit-free silicon surfaces on a silicon body having a bulk resistivity of less than that set forth in the above example, .01 ohm-centimeter material, is desired, .01 weight percent of boron is added to high purity silicon and its detrimental effects on the physical nature of the polished surface are overcome by adding .0495 weight percent of gallium or .0108 weight percent of aluminum.

It is to be appreciated that the above-described embodiments are merely illustrative of the invention and that other conductivity type determining substances, having the primary function of determining the resistivity and conductivity type of silicon, can be incorporated in solution with silicon and their tendency to alter the lattice constant of the solution from that of pure silicon can be compensated for by the addition of other elements having appropriate atomic dimensions.

What is claimed is:

1. A ternary alloy of silicon comprising about .02 weight percent of boron, about .13 weight percent of gallium, and the remainder high purity silicon.

2. A ternary alloy consisting essentially of silicon, gallium, and boron, wherein the ratio by atomic percentages of gallium to boron is in the range of from about 0.4 to 1.1 and wherein the weight percent of boron is in the range of from about .01 percent to 0.5 percent.

3. A ternary alloy in accordance with claim 2 wherein the ratio by atomic percentages of gallium to boron is approximately 0.77.

4. A ternary alloy consisting essentially of silicon, aluminum, and boron wherein the ratio by atomic percentages of aluminum to boron is in the range of from about 0.2 to 0.6 and wherein the weight percent of boron is in the range of from about 0.01 percent to 0.5 percent.

5. A ternary alloy in accordance with claim 4 wherein the ratio by atomic percentages of aluminum to boron is approximately 0.43.

6. A semiconductive translating device comprising a mass of an alloy in accordance with claim 2, a low resistance, essentially symmetrical connection to said mass, a high purity surface upon a portion of said mass spaced from said connection, and a tungsten point engaging said high purity surface.

References Cited in the file of this patent

UNITED STATES PATENTS 2,485,069 Scaff ------------------ Oct. 18, 1949

OTHER REFERENCES

Physical Review, II, vol. 90, No. 4, pp. 521, 522, May 15, 1953.

Physical Review, I, vol. 69, Nos. 7, 8, p. 357, April 1 and 15, 1956.